United States Patent
Ndobo-Epoy et al.

(10) Patent No.: US 10,822,794 B2
(45) Date of Patent: Nov. 3, 2020

(54) SYSTEM, METHOD AND APPARATUS FOR COMPRESSED INSULATION

(71) Applicant: CERTAINTEED CORPORATION, Malvern, PA (US)

(72) Inventors: Jean-Philippe Ndobo-Epoy, Westboro, MA (US); Artemis Agelaridou Twohig, Marlboro, MA (US); Michael J. Lembo, Souderton, PA (US); Todd P. Dinoia, Littleton, MA (US); Minas R. Apelian, Phoenixville, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 16/788,911

(22) Filed: Feb. 12, 2020

(65) Prior Publication Data
US 2020/0181903 A1 Jun. 11, 2020

Related U.S. Application Data (62) Division of application No. 15/223,852, filed on Jul. 29, 2016.

(Continued)

(51) Int. Cl.
*E04B 2/56* (2006.01)
*E04B 1/76* (2006.01)

(52) U.S. Cl.
CPC ............ *E04B 2/562* (2013.01); *E04B 1/7604* (2013.01); *E04B 1/7658* (2013.01); *E04B 1/7675* (2013.01); *E04B 1/7662* (2013.01)

(58) Field of Classification Search
CPC ........ E04B 1/7604; E04B 1/14; E04B 1/7658; E04B 1/7662; E04B 1/7675; E04B 2/562
See application file for complete search history.

(56) References Cited

U.S. PATENT DOCUMENTS 2,858,580 A 11/1958 Thompson et al.
3,729,880 A 5/1973 Eliason
(Continued)

FOREIGN PATENT DOCUMENTS

| EP | 1037740 B1 | 3/2006 |
|---|---|---|
| WO | 9929500 A1 | 6/1999 |
| WO | 2015094971 A1 | 6/2015 |

OTHER PUBLICATIONS

Building Insulation Compressed R-Value Chart Owens Corning (Year: 2015).*

(Continued)

*Primary Examiner* — Andrew J Triggs
(74) *Attorney, Agent, or Firm* — Abel Schillinger, LLP; Thomas H. Osborn (57) ABSTRACT

An insulation product may include a container, a first insulation material forming a first layer inside the container, and a second insulation material forming a second layer inside the container, and the first layer is compressed by the second layer. A structure in a building may include studs, first and second claddings mounted to opposite sides of the studs, and structure spaces defined between the studs and the opposing claddings. A first insulation material may include first layers on and substantially covering a first one of the claddings inside the structure spaces. In addition, a second insulation material may have second layers inside the structure spaces. The first layers are compressed and substantially covered by the second layers, and the second layers substantially cover a second one of the claddings inside the structure spaces.

20 Claims, 5 Drawing Sheets

Related U.S. Application Data (60) Provisional application No. 62/198,968, filed on Jul. 30, 2015.

(56) References Cited

U.S. PATENT DOCUMENTS

| | | | |
|---|---|---|---|
| 3,785,913 A * | 1/1974 | Hallamore | E04C 2/284 |
| | | | 428/71 |
| 4,103,467 A | 8/1978 | Lindal | |
| 4,467,014 A | 8/1984 | Smith | |
| 4,471,591 A | 9/1984 | Jamison | |
| 4,685,402 A | 8/1987 | Nelson et al. | |
| 5,095,192 A | 3/1992 | McEntire et al. | |
| 5,330,816 A | 7/1994 | Rusek, Jr. | |
| 5,389,167 A | 2/1995 | Sperber | |
| 5,860,265 A | 1/1999 | Knudson et al. | |
| 7,168,216 B2 | 1/2007 | Hagen, Jr. | |
| 7,703,253 B2 | 4/2010 | Lembo | |
| 7,980,358 B2 | 7/2011 | Soltau et al. | |
| 8,132,387 B2 | 3/2012 | Wagner | |
| 8,281,532 B2 | 10/2012 | Pulte et al. | |
| 8,371,338 B2 | 2/2013 | Princell et al. | |
| 8,793,952 B2 | 8/2014 | Olang | |
| 9,297,596 B2 | 3/2016 | Lehr et al. | |
| 2006/0201089 A1 * | 9/2006 | Duncan | E04B 1/7604 |
| | | | 52/309.8 |
| 2006/0272280 A1 | 12/2006 | Romes et al. | |
| 2008/0115432 A1 * | 5/2008 | Groppe | E04B 1/24 |
| | | | 52/220.2 |
| 2009/0107068 A1 | 4/2009 | Fay et al. | |
| 2009/0324924 A1 | 12/2009 | Romes et al. | |
| 2012/0174511 A1 | 7/2012 | Harding | |
| 2015/0135619 A1 | 5/2015 | Noonan et al. | |
| 2017/0030074 A1 * | 2/2017 | Ndobo-Epoy | E04C 2/243 |

OTHER PUBLICATIONS

Additional results Jul. 28, 2015, 3 pages.
Prior art search results Jul. 15, 2016, 3 pages.
International Search Report and Written Opinion for PCT Application PCT/US2016/044805, dated Nov. 7, 2016, 14 pages.
Insulation Institute, "The Facts About Compressing Fiber Glass Insulation," Year: NA, 2 pages.
Building Insulation Compressed R-Value Chart, Technical Bulletin, Owens Corning, 2015, 1 page.

* cited by examiner

SYSTEM, METHOD AND APPARATUS FOR COMPRESSED INSULATION

CROSS-REFERENCE TO RELATED APPLICATION(S)

This application is a divisional of and claims priority under 35 U.S.C. § 120 to U.S. patent application Ser. No. 15/223,852, entitled "SYSTEM, METHOD AND APPARATUS FOR COMPRESSED INSULATION," by Jean-Philippe NDOBO-EPOY et al., filed Jul. 29, 2016, which application claims priority under 35 U.S.C. § 119(e) to U.S. Provisional Application No. 62/198,968, entitled "SYSTEM, METHOD AND APPARATUS FOR COMPRESSED INSULATION," by Jean-Philippe NDOBO-EPOY et al., filed Jul. 30, 2015, all of which are assigned to the current assignee hereof and incorporated herein by reference in their entireties.

BACKGROUND OF THE INVENTION

Field of the Disclosure

The present invention relates in general to insulation and, in particular, to a system, method and apparatus for insulation compressed by expanded foam.

Description of the Related Art

Figure 1:
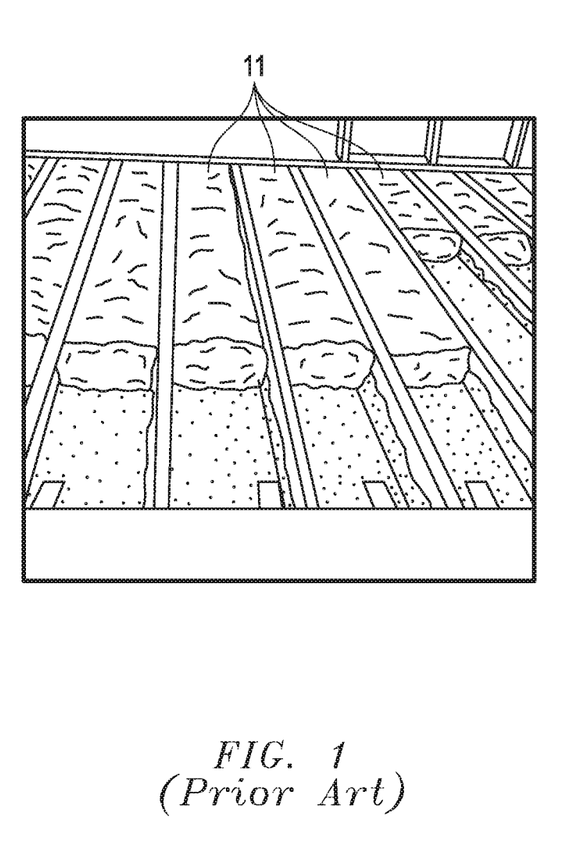
FIG. 1 is an isometric photograph of conventional fiberglass insulation in a home.
Figure 2:
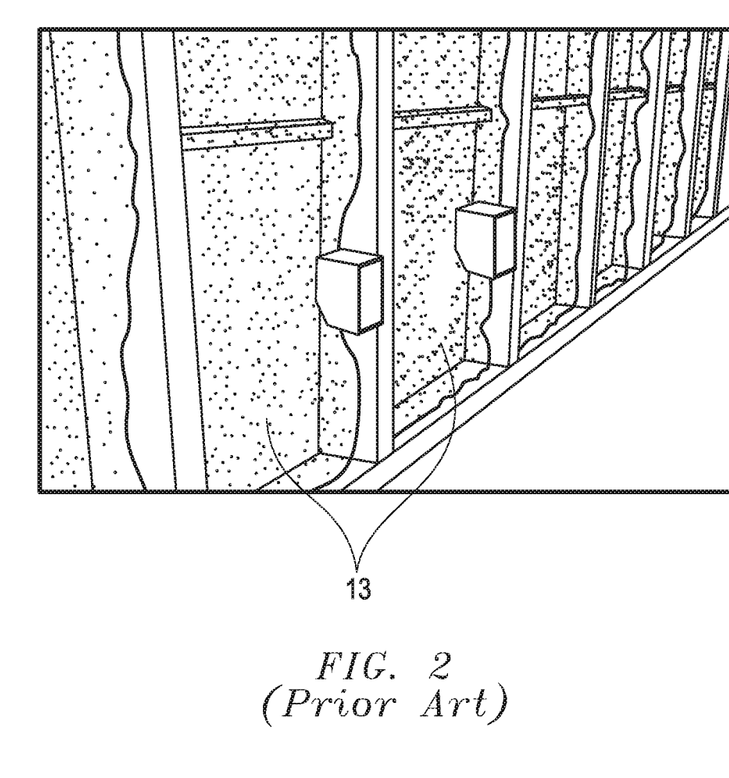
FIG. 2 is an isometric photograph of conventional closed cell spray foam insulation in a home.

The use of insulation to improve the energy efficiency of buildings is well known. The evolution of the energy codes in the U.S. requires insulation materials with a better thermal performance, such as lower thermal conductivity. The most common insulation products used in the U.S. are fiberglass, such as fiberglass batts 11 (FIG. 1), and closed cell spray foam 13 (FIG. 2).

Closed cell foams give both excellent airtightness and insulation that is superior to fiberglass, but is much more expensive than fiberglass. Open cell foams are much cheaper than open cell foams, but require much greater volumes to achieve the requisite levels of airtightness and insulation. Due to the high price of closed cell foams, insulation contractors typically only use a thin layer of them for the airtightness, and complete their insulation installations with inexpensive fiberglass.

The code IECC2012 now requires the following standards for walls. In climate zones 3-5, either an R13 (h·ft$^2$·F/Btu) between studs with an R5 continuous insulation, or an R20 between studs, which is achievable only with closed cell foam. For climate zones 6-8, an R20 between rafters an R5 continuous external insulation is acceptable.

Manufacturing high performing insulation (i.e., with low thermal conductivity) is a challenge because the density must be increased to decrease the radiative transfers. This reduces the speed of production lines and reduces strongly reduces the compression of products. For example, an R11 (with density 1 pound per cubic foot, or lb/ft$^3$) product can be compressed by a factor of 10 times per bag. An R15 product (1.5 lb/ft$^3$) can be compressed by a factor of a maximum of 3 times per bag, which means higher logistic costs, less product per bag, difficulty in manipulation at job sites and is more difficult to cut.

Currently, an R16 product is not produced in the U.S. R16 is the best fiberglass product available in Europe. It has very high density at 3 lb/ft$^3$, requires super stretching, but is essentially incompressible. Even if such a product were available in the U.S., the market would be unwilling to pay twice the price of an R15 to get an R16. These platforms can limit the insulation effectiveness to below code requirements. Thus, improvements in insulation continue to be of interest.

SUMMARY

Embodiments of a system, method and apparatus for compressed insulation are disclosed. For example, an insulation product may include a container, a first insulation material forming a first layer inside the container, and a second insulation material forming a second layer inside the container, and the first layer is compressed by the second layer.

In another embodiment, a method of fabricating an insulation product may include providing a container; installing a first layer of a first insulation material on an interior surface of the container; and then installing a second layer of a second insulation material between the first layer and an opposite interior surface of the container, such that the second insulation material expands and compresses the first layer.

In an alternate embodiment, a method of fabricating an insulation product may include defining a structure in a building, the structure having studs, claddings mounted to the studs, and structure spaces between the studs and claddings; installing first layers of a first insulation material and substantially covering a first one of the claddings inside respective ones of the structure spaces; and then installing second layers of a second insulation material in the structure spaces between the first layers and an opposite cladding of the structure, such that the second insulation material expands and compresses the first layers.

In yet another embodiment, a structure in a building may include studs, first and second claddings mounted to opposite sides of the studs, and structure spaces defined between the studs and the opposing claddings. A first insulation material may include first layers on and substantially covering a first one of the claddings inside the structure spaces. In addition, a second insulation material may have second layers inside the structure spaces. The first layers are compressed and substantially covered by the second layers, and the second layers substantially cover a second one of the claddings inside the structure spaces.

Another embodiment may include a structure in a building having studs, first and second claddings mounted to opposite sides of the studs, and structure spaces defined between the studs and the claddings. Two different types of insulation may be used in the structure spaces, with a second type of the insulation compressing a first type of the insulation. In addition, at least about 80% of the structure meets a specification including: a thermal conductivity ($\lambda$) in a range of about 0.14 Btu·in/(ft$^2$·hr·F) to about 0.28 Btu·in; a thermal resistance (R-value) in a range of about R13 to about R22; an acoustic property comprising noise reduction in a range of about 33 dB to about 40 dB; and an average density in a range of about 0.063 lb/ft$^3$ to about 1.87 lb/ft$^3$.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical embodiments.

DETAILED DESCRIPTION

Figure 3:
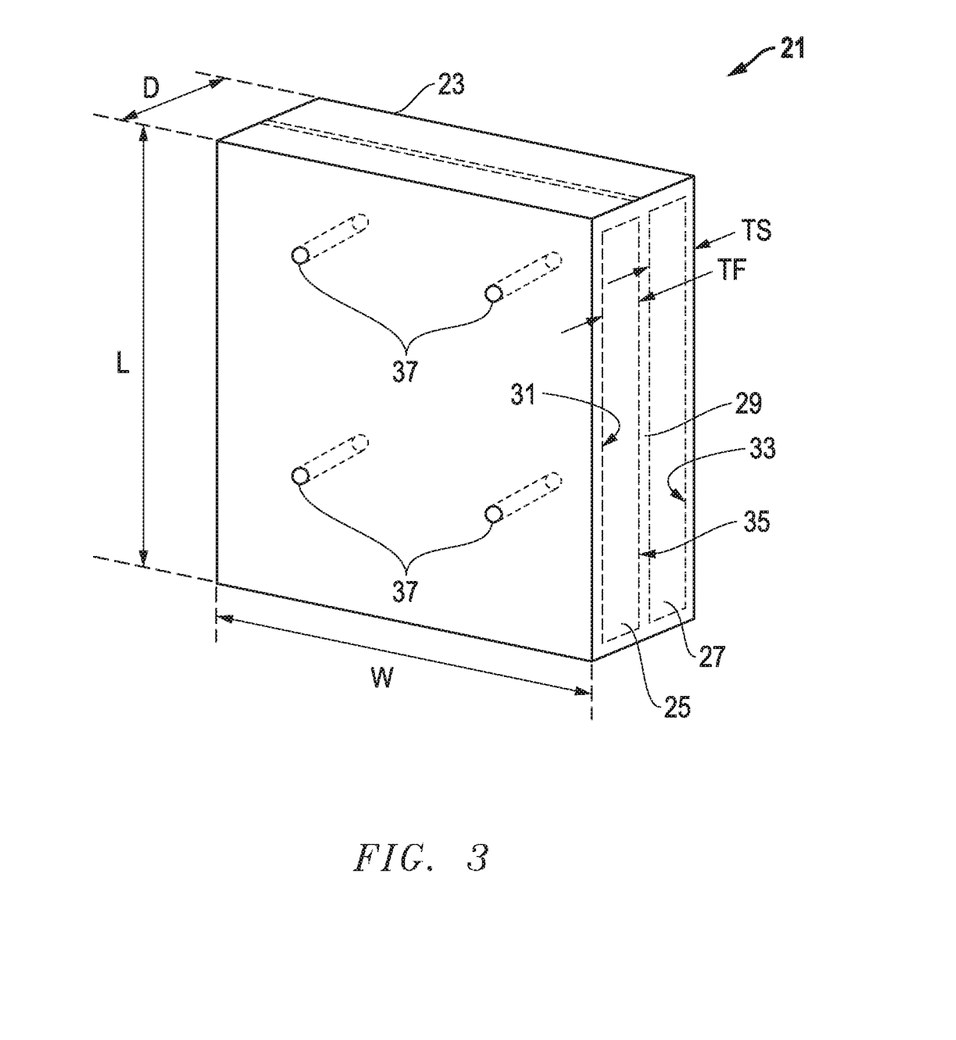
FIG. 3 is a schematic, partially sectioned, isometric view of an embodiment of compressed insulation product.

Embodiments of a system, method and apparatus for compressed insulation are disclosed. For example, as shown in FIG. 3, an insulation product 21 may include a container 23 that is portable. A first insulation material may form a first layer 25 inside the container 23. A second insulation material may form a second layer 27 inside the container, and the first layer is compressed by the second layer. In some versions, the first and second layers 25, 27 substantially fill the container 23.

Some embodiments of the insulation product 21 may include the second layer 27 not penetrating into the first layer 25. For example, the first layer 25 can include at least one liner, facing and barrier 29, between the first layer 25 and the second layer 27. Versions of the at least one liner, facing and barrier 29 may include at least one of paper, plastic, glass mat and dense glass mat. The at least one liner, facing and barrier 29 can partially or completely separate the first layer 25 and the second layer 27.

In an example, the first layer 25 can substantially cover an entire interior surface 31 of the container 23. The second layer 27 can substantially cover an entire opposite interior surface 33 of the container 23. The second layer 27 can substantially cover and compress an entire surface 35 of the first layer 25.

In other embodiments, the first insulation material may include one or more materials. For example, the first insulation material can include at least one of a compressible insulation, an organic material, a compressible mineral material, a synthetic material, cellulose, fiberglass, polyester fibers, polyethylene fibers, glass wool, stone wool, sheep wool, wood fibers, cotton, hemp, flax, cork, straw, feathers and chopped recycled cloth.

Likewise, embodiments of the second insulation material may include one or more materials. For example, the second insulation material can include at least one of a foam, a spray foam, a closed cell spray foam, and a slow rise spray foam. In one version, the second insulation material may include at least one of isocyanate, methylene diphenyl diisocyanate (MDI), polyol resin and polyether polyols. In another version, one or more commercially available expanding foam materials can be used.

Embodiments of the second insulation material may include an airtight layer in the insulation product. The airtight layer may include an air permeance of less than about 0.004 L/(s·m$^2$) @ 75 Pa for a one inch thickness. In addition or alternatively, the second insulation material can have a water vapor permeance of not greater than about 2 perms/inch.

Other examples of the second insulation material may include an expansion factor of at least about 2×, such as at least about 5×, at least about 10×, at least about 20×, at least about 50×, or even at least about 100×. Other versions of the second insulation material can include an expansion factor of not greater than about 200×, such as not greater than about 400×, not greater than about 600×, not greater than about 800×, or even not greater than about 1000×. Other embodiments of the second insulation material can have an expansion factor in a range between any of these values.

Embodiments of the first insulation material can have a higher density than the second insulation material. In other versions, the second insulation material can have a higher density that the first insulation material.

In some examples, the first insulation material can have an uncompressed density. For example, the first insulation material can have an uncompressed density of at least about 0.35 lb/ft$^3$. In other versions, the first insulation material can have an uncompressed density of at least about 0.5 lb/ft$^3$, such as at least about 0.62 lb/ft$^3$, at least about 0.75 lb/ft$^3$, at least about 0.94 lb/ft$^3$, or even at least about 1.25 lb/ft$^3$. In other examples, the first insulation material can have an uncompressed density that is not greater than about 2.8 lb/ft$^3$. In still other versions, the first insulation material can have an uncompressed density cab be not greater than about 2.5 lb/ft$^3$, such as not greater than about 2.2 lb/ft$^3$, not greater than about 1.87 lb/ft$^3$, or even not greater than about 1.56 lb/ft$^3$. In addition, embodiments of the first insulation material can have an uncompressed density in a range between any of these values.

In other examples, the first insulation material can have a compressed density. For example, the first insulation material can have a compressed density (e.g., such as inside the container 23) of at least about 0.62 lb/ft$^3$. In other versions, the first insulation material can have a compressed density of at least about 0.75 lb/ft$^3$, such as at least about 0.94 lb/ft$^3$, at least about 1.25 lb/ft$^3$, or even at least about 1.56 lb/ft$^3$. In other versions, the first insulation material can have a compressed density of not greater than about 3 lb/ft$^3$. The first insulation material also can have a compressed density of not greater than about 2.8 lb/ft3, such as not greater than about 2.5 lb/ft$^3$, not greater than about 2.2 lb/ft$^3$, or even not greater than about 1.87 lb/ft$^3$. In addition, embodiments of the first insulation material can have a compressed density in a range between any of these values.

Embodiments of the second insulation material can have a density of at least about 0.25 lb/ft$^3$, such as at least about 0.4 lb/ft$^3$, at least about 1 lb/ft$^3$, at least about 1.5 lb/ft$^3$, or even at least about 2 lb/ft$^3$. In other versions, the second insulation material can have a density of not greater than about 3 lb/ft$^3$, such as not greater than about 4 lb/ft$^3$, not greater than about 5 lb/ft$^3$, not greater than about 6 lb/ft$^3$, or even not greater than about 8 lb/ft$^3$. In addition, embodiments of the second insulation material can have a density in a range between any of these values.

In some versions, the first insulation material can be compressed by at least about 10%. In other examples, the first insulation material can be compressed by at least about 20%, such as at least about 30%, at least about 40%, or even at least about 45%. In other versions, the first insulation material can be compressed by not greater than about 80%, such as not greater than about 75%, not greater than about 70%, not greater than about 65%, or even not greater than about 60%. In addition, embodiments of the first insulation material can be compressed in a range between any of these values.

In addition, the insulation product can have a thickness ratio (TR) that may be defined as a thickness of the compressed first layer (TF; see FIG. 3) to a thickness of the second layer (TS). For example, the thickness ratio (TR=TF/TS) can be at least about 0.1, such as at least about 0.2, at least about 0.3, at least about 0.4, or even at least about 0.5. In other versions, the thickness ratio can be not greater than about 0.9, such as not greater than about 0.8, not greater than about 0.7, or even not greater than about 0.6. In addition, embodiments of the insulation product can have a thickness ratio in a range between any of these values.

Embodiments of the first insulation material may include an uncompressed thermal resistance (R-value). For example, the first insulation material can have an uncompressed R-value of at least about R10, such as at least about R11, at least about R12, at least about R13, at least about R14, or even at least about R15. In other examples, the first insulation material can have an uncompressed R-value of not greater than about R25, such as not greater than about R24, not greater than about R23, not greater than about R22, not greater than about R21, or even not greater than about R20. In addition, embodiments of the first insulation material can have an uncompressed R-value in a range between any of these values.

Other embodiments of the first insulation material may include a compressed R-value. For example, the first insulation material can have a compressed R-value of at least about R12, such as at least about R14, at least about R16, at least about R18, or even at least about R20. In other versions, the first insulation material can have a compressed R-value of not greater than about R34, such as not greater than about R32, not greater than about R30, not greater than about R28, or even not greater than about R26. In addition, embodiments of the first insulation material can have a compressed R-value in a range between any of these values.

Versions of the first insulation material may include an uncompressed thermal conductivity ($\lambda$). For example, the first insulation material can have an uncompressed $\lambda$ of at least about 0.31 Btu·in/(ft²·hr·F), such as at least about 0.30 Btu·in, at least about 0.29 Btu·in, at least about 0.28 Btu·in, or even at least about 0.27 Btu·in. Other versions of the first insulation material may include an uncompressed $\lambda$ of not greater than about 0.22 Btu·in, not greater than about 0.23 Btu·in, not greater than about 0.24 Btu·in, not greater than about 0.25 Btu·in, such as not greater than about 0.26 Btu·in. In addition, embodiments of the first insulation material can have an uncompressed $\lambda$ in a range between any of these values.

Other versions of the first insulation material may include a compressed k. For example, the first insulation material can have a compressed $\lambda$ of at least about 0.31 Btu·in/(ft²·hr·F), such as at least about 0.29 Btu·in, at least about 0.28 Btu·in, at least about 0.27 Btu·in, or even at least about 0.26 Btu·in. Other examples of the first insulation material can have a compressed $\lambda$ of not greater than about 0.22 Btu·in, such as not greater than about 0.23 Btu·in, not greater than about 0.24 Btu·in, not greater than about 0.25 Btu·in, or even not greater than about 0.26 Btu·in. In addition, embodiments of the first insulation material can have a compressed $\lambda$ in a range between any of these values.

Embodiments of the second insulation material may include a thermal conductivity ($\lambda$) as well. For example, the second insulation material can have a $\lambda$ of at least about 0.18 Btu·in/(ft²·hr·F), such as at least about 0.17 Btu·in, or even at least about 0.16 Btu·in. Alternate versions of the second insulation material can have a $\lambda$ of not greater than about 0.14 Btu·in, such as not greater than about 0.15 Btu·in, or even not greater than about 0.16 Btu·in. In addition, embodiments of the second insulation material can have a $\lambda$ in a range between any of these values.

Some embodiments of the second insulation material can include a thermal resistance (R-value, aged). For example, the second insulation material can include an aged R-value of at least about R4/inch, such as at least about R5/inch, at least about R5.5/inch, or even at least about R5.75/inch. Other versions of the second insulation material can have an aged R-value of not greater than about R7/inch, such as not greater than about R6.5/inch, or even not greater than about R6.25/inch. In addition, embodiments of the second insulation material can have an aged R-value in a range between any of these values.

Embodiments of the insulation product may include an overall, aged R-value, which may vary by size or application. For example, a version of the insulation product for 2×4 wall stud applications can have an overall, aged R-value of at least about R12, such as at least about R13, at least about R14, at least about R15, or even at least about R16. Other versions of the insulation product can have an overall, aged R-value of not greater than about R23, such as not greater than about R22, not greater than about R21, not greater than about R20, or even not greater than about R19. In addition, embodiments of the insulation product can have an overall, aged R-value in a range between any of these values.

Embodiments of the insulation product for 2×6 wall stud applications can have an overall, aged R-value of at least about R22, such as at least about R23, at least about R24, at least about R25, or even at least about R26. Other versions of the insulation product for 2×6 wall stud applications can have an overall, aged R-value of not greater than about R36, such as not greater than about R35, not greater than about R34, not greater than about R33, or even not greater than about R32. In addition, embodiments of the insulation product can have an overall, aged R-value in a range between any of these values.

An example of the insulation product can have an overall acoustic property comprising a noise reduction or Sound Transmission Class (STC) rating that is an integer rating of how well a building partition attenuates airborne sound. It is widely used to rate interior partitions, ceilings/floors, doors, windows and exterior wall configurations (see ASTM International Classification E413 and E90). Embodiments of the insulation product can have a noise reduction of at least about 33 dB, such as at least about 34 dB, at least about 35 dB, at least about 36 dB, or even at least about 37 dB. In other versions, the insulation product can have a noise reduction of not greater than about 38 dB, such as not greater than about 39 dB, or even not greater than about 40 dB. In addition, embodiments of the insulation product can have an overall noise reduction in a range between any of these values.

In some embodiments, the container 23 for the insulation product 21 may include at least one material. For example, the container 23 may include one or more of a natural material, a synthetic material, a board, wood, gypsum, rigid insulation, oriented strand board (OSB), plywood and particle board.

In other examples, the container 23 may include a flexural strength (e.g., per ASTM C473 Method A) of at least about 10 lbf, such as at least about 20 lbf, at least about 30 lbf, at least about 40 lbf, at least about 50 lbf, or even at least about 60 lbf. In other versions, the container 23 can have a flexural strength of not greater than about 300 lbf, such as not greater than about 200 lbf, not greater than about 175 lbf, not greater than about 150 lbf, not greater than about 125 lbf, or even not greater than about 100 lbf. In addition, embodiments of the container can have a flexural strength in a range between any of these values.

In one example, the container 23 can be a rectangular box. For example, the rectangular box may include a length L of at least about 1 foot, such as at least about 3 feet, at least about 5 feet, at least about 7 feet, or even at least about 9 feet. Other versions of the box can have a length L of not greater than about 36 feet, such as not greater than about 24 feet, not greater than about 16 feet, not greater than about 14 feet, or even not greater than about 12 feet. In addition, embodiments of the box can have a length in a range between any of these values.

In another example, the container 23 or box may include a width W of at least about 6 inches, such as at least about 8 inches, at least about 10 inches, at least about 12 inches, or even at least about 14 inches. Other versions can have a width W of not greater than about 16 inches, such as not greater than about 20 inches, not greater than about 24 inches, not greater than about 28 inches, not greater than about 32 inches, not greater than about 36 inches, not greater than about 40 inches, not greater than about 44 inches, or even not greater than about 48 inches. Still other embodiments of the box can have a width in a range between any of these values.

Other examples of the container 23 or box may include a depth D of at least about 3 inches, such as at least about 3.5 inches, at least about 4 inches, or even at least about 4.5 inches. Some versions of the box can have a depth D of not greater than about 5 inches, such as not greater than about 5.5 inches, or even not greater than about 6 inches. Other embodiments of the box can have a depth in a range between any of these values.

In yet another example, the first layer 25 can be substantially uniform, and the second layer 27 can be substantially uniform. Each layer 25, 27 can have has a flatness, which may be characterized in terms of maximum roughness of a surface. For example, Rmax may be defined as the distance measured from the top of the highest peak to the bottom of the lowest valley of a surface texture. For the surfaces of the first and second layers 25, 27, Rmax can be at least about 0.08 inches, such as at least about 0.16 inches, at least about 0.24 inches, at least about 0.31 inches, or even at least about 0.39 inches. In other versions, Rmax can be not greater than about 0.79 inches, such as not greater than about 0.71 inches, not greater than about 0.63 inches, not greater than about 0.55 inches, or even not greater than about 0.47 inches. In addition, embodiments of the layers can have an Rmax in a range between any of these values.

In some embodiments, the container 23 (FIG. 3) can be cut to essentially any length L, and the container 23 can be cut to essentially any width W. However, the thickness of the container 23 should not be cut in the depth direction D, since the thickness and performance of the insulation layers 25, 27 would be affected by such a cut.

Figure 4:
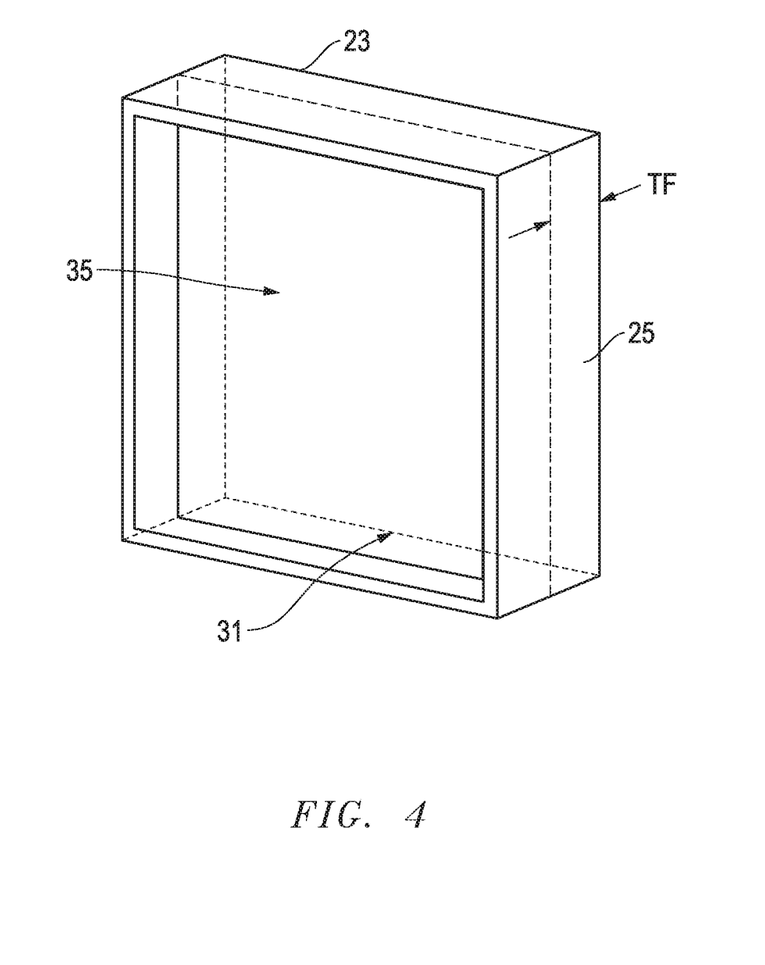
FIG. 4 is an isometric view of an embodiment of an open container having a first layer of insulation installed therein.

Embodiments of a method of fabricating an insulation product may be performed at a job site, or as a prefabrication method prior to use at a job site. For example, the method may include providing a container 23; installing a first layer 25 (FIG. 4) of a first insulation material on an interior surface 31 of the container 23; and then installing a second layer 27 (FIG. 3) of a second insulation material between the first layer 25 and an opposite interior surface 33 of the container 23, such that the second insulation material expands and compresses the first layer 25.

In one example of the method, the container 23 can be open (FIG. 4) during the second step, and the container 23 can be closed (FIG. 3) during the third step. In another example of the method, the container 23 can have a single aperture 37, and the third step may include injecting the second insulation material through the single aperture 37. In still another example of the method, the container 23 may include a plurality of apertures 37, and third step can include simultaneously injecting the second insulation material through all of the plurality of apertures 37. Embodiments of the third step of the method may include mixing isocyanate and polyol resin. Still other embodiments of the method may further include at least one of the steps of cutting the container 23 to a desired length L and cutting the container 23 to a desired width W, but not cutting the container 23 in the depth direction D.

Figure 5A:
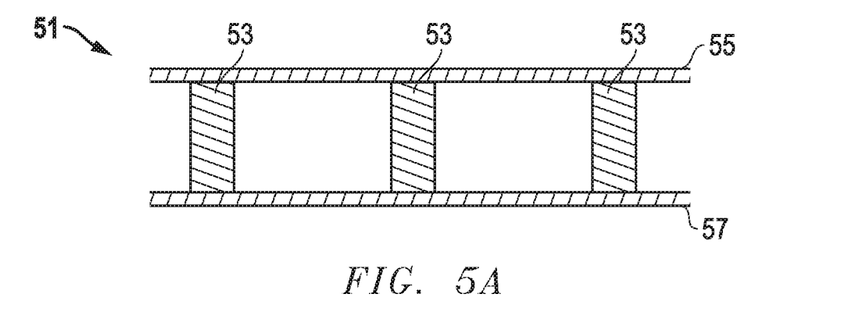
FIGS. 5A-5D are sequential, sectional views of an embodiment of steps of a method.
Figure 5B:
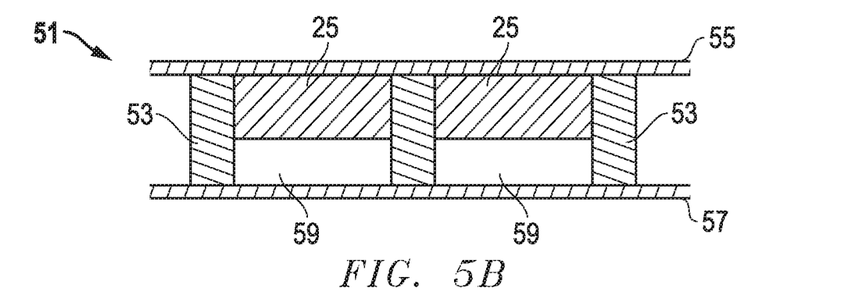
Figure 5C:
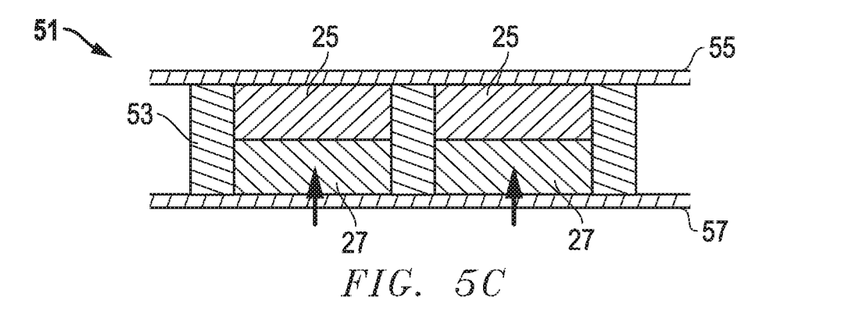
Figure 5D:
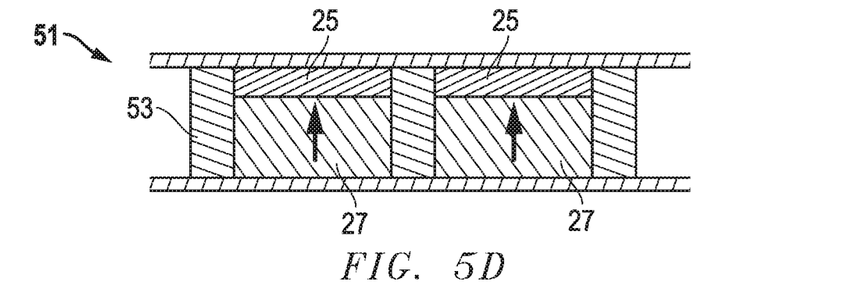

In another embodiment, a method of fabricating an insulation product for new, in-situ building construction may be performed. For example, one embodiment of the method may include defining a structure 51 (FIG. 5A) in a building. The structure 51 may include studs 53, cladding 55, 57 mounted to the studs 53, and structure spaces 59 between the studs 53 and claddings 55, 57; installing first layers 25 of a first insulation material and substantially covering a first one of the claddings 55 (FIG. 5B) inside respective ones of the structure spaces 59; and then installing second layers 27 (FIG. 5C) of a second insulation material in the structure spaces 59 between the first layers 25 and an opposite cladding 57 of the structure 51, such that the second insulation material expands (FIG. 5D) and compresses the first layers 25.

In other embodiments of the method, the structure spaces 59 can remain open (analogous to FIG. 4) during the second step, and the structure spaces 59 can be closed (analogous to FIG. 3) during the third step. In another example, the first one of the claddings 55 can be an interior cladding, the second one of the claddings 57 can be an exterior cladding, the second step can include installing the first layers 25 adjacent an interior of the building, and the third step may include installing the second layers 27 adjacent an exterior of the building. In another example of the method, the structure 51 can be at least one of a floor with floor spaces, a wall with wall spaces, a ceiling with ceiling spaces, and a roof with roof spaces.

Embodiments of a structure in a building may include studs, first and second claddings mounted to opposite sides of the studs, and structure spaces defined between the studs and the opposing claddings. A first insulation material may include first layers on and substantially covering a first one of the claddings inside the structure spaces. In addition, a second insulation material may include second layers inside the structure spaces, the first layers are compressed and substantially covered by the second layers, and the second layers substantially cover a second one of the claddings inside the structure spaces. An example of the structure can be at least one of a wall with wall spaces, a ceiling with ceiling spaces, and a roof with roof spaces.

Other embodiments of a structure in a building may include studs, first and second claddings mounted to opposite sides of the studs, and structure spaces defined between the studs and the opposing claddings; and, optionally, two different types of insulation in the structure spaces, with a second type of the insulation compressing a first type of the insulation. In addition, at least about 80% of the structure can meet a specification comprising: a thermal conductivity (λ) in a range of about 0.14 Btu·in/(ft²·hr·F) to about 0.28 Btu·in; a thermal resistance (R-value) in a range of about R13 to about R22; an acoustic property comprising noise reduction in a range of about 33 dB to about 40 dB; and an average density in a range of about 0.63 lb/ft³ to about 1.87 lb/ft³.

Still other embodiments of the system may include a cavity to be insulated, a flexible compressible insulation portion and an expanding compressing insulation portion. When the expanding portion is deployed, the compressible portion reduces in volume and moves to a higher density, thereby improving its thermal resistance value. In another version, both the first and second insulation materials can be compressed. For example, open cell foam may be injected in a cavity with fiberglass, such that part of the compression will be shared by the fiberglass as well as the open cell foam. In addition, the second material may comprise a form of cellulose, such as blown fiberglass.

Examples

In a first example, the product SPI Pour Envelo SFC I 2.0 CG closed cell foam, available from Specialty Products, Inc., of Lakewood, Wash., was used to compress the first layer of fiberglass insulation at different densities (prior to compression) from R11 (8.5 kg/m³) to R15 (22 kg/m³). When 2 ounces of pour foam per square foot was used in a cavity having a thickness of 3.5 inches, the swelling of the foam was relatively uneven with deviations in compressed thickness of the first layer. For example, one inch of uncompressed insulation varied in compressed thickness from 0.5 inch to about 2 inches. Some of the first layer of fibers were not compressed enough (from about 3.5 inches to 2.5 inches) to have a significant impact on the thermal conductivity.

Figure 6:
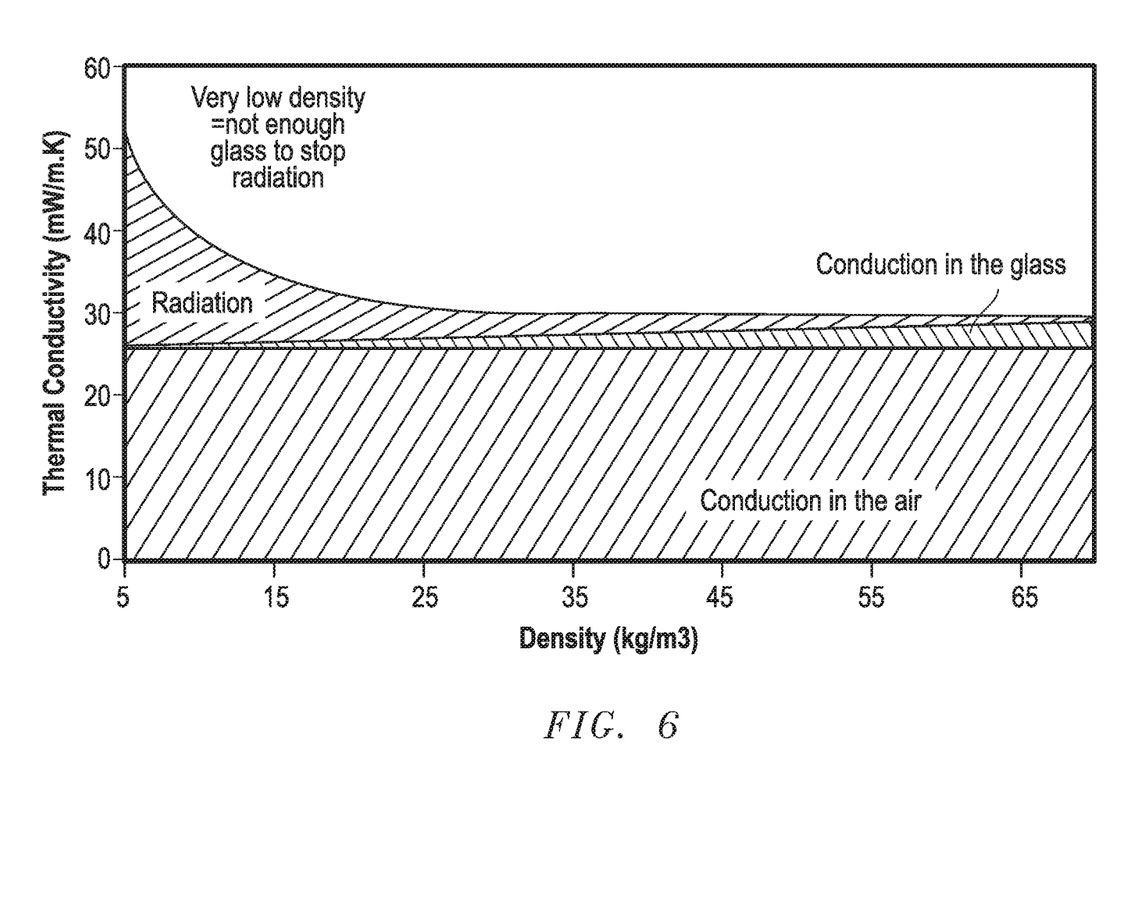
FIG. 6 is a Larkin curve diagram illustrating the performance of various embodiments.

In examples where 3.5 ounces of pour foam per square foot were used (which is the maximum amount that can be added in a 3.5 inch cavity without bursting it), the foam swelled uniformly to about 2.5 inches, compressing the fibers of the first layer from 3.5 inches to 1 inch. However, for R13 and R15 in the first layer, the compression is too high and the advantage of the compression is lost due to the solid conduction portion of the Larkin curve (FIG. 6), which illustrates the effects of air, glass and radiation. The Larkin curve shows that the higher densities yield undesirable higher the solid conduction, with the optimum performance at about 40 kg/m³.

In examples where R11 was used in the first layer (which is much lighter than R13 and R15), the compression ranged from about 8 to about 28 kg/m³, which corresponds to thicknesses of 3.5 inches to 1 inch. The use of 100% pour foam in the 3.5 inch cavity produced a final product with R20. In contrast, the use of 100% R11 (with no second layer) obviously yields an R11 final product, which is inexpensive but performs poorly. However, a final product of R18 is produced with a 70% foam second layer and a 30% fiberglass first layer.

Other versions may include one or more of the following embodiments:

Embodiment 1

An insulation product, comprising: a container; a first insulation material forming a first layer inside the container; and a second insulation material forming a second layer inside the container, and the first layer is compressed by the second layer.

Embodiment 2

The insulation product of any of these embodiments, wherein the first and second layers substantially fill the container.

Embodiment 3

The insulation product of any of these embodiments, wherein the first insulation material has a higher density than the second insulation material.

Embodiment 4

The insulation product of any of these embodiments, wherein the second insulation material has a higher density than the first insulation material.

Embodiment 5

The insulation product of any of these embodiments, wherein the first insulation material comprises at least one of compressible insulation, an organic material, a compressible mineral material, a synthetic material, cellulose, fiberglass, polyester fibers, polyethylene fibers, glass wool, stone wool, sheep wool, wood fibers, cotton, hemp, flax, cork, straw, feathers and chopped recycled cloth.

Embodiment 6

The insulation product of any of these embodiments, wherein the second insulation material comprises at least one of a foam, a spray foam and a slow rise spray foam.

Embodiment 7

The insulation product of any of these embodiments, wherein the second insulation material comprises at least one of isocyanate, methylene diphenyl diisocyanate (MDI), polyol resin and polyether polyols.

Embodiment 8

The insulation product of any of these embodiments, wherein the second insulation material comprises at least one commercially available expanding foam.

Embodiment 9

The insulation product of any of these embodiments, wherein the second insulation material comprises an airtight layer in the insulation product.

Embodiment 10

The insulation product of any of these embodiments, wherein the airtight layer comprises an air permeance of less than about 0.004 L/(s·m²) @ 75 Pa for a one inch thickness.

Embodiment 11

The insulation product of any of these embodiments, wherein the second insulation material has a water vapor permeance of not greater than about 2 perms/inch.

Embodiment 12

The insulation product of any of these embodiments, wherein the first layer comprises at least one liner, facing and barrier between the first layer and the second layer.

Embodiment 13

The insulation product of any of these embodiments, wherein the at least one liner, facing and barrier comprises at least one of paper, plastic, glass mat and dense glass mat.

Embodiment 14

The insulation product of any of these embodiments, wherein the second layer does not penetrate into the first layer.

Embodiment 15

The insulation product of any of these embodiments, wherein the second insulation material comprises a closed cell spray foam.

Embodiment 16

The insulation product of any of these embodiments, wherein the first insulation material comprises: an uncompressed density of at least about at least about 0.35 lb/ft$^3$, at least about 0.5 lb/ft$^3$, at least about 0.62 lb/ft$^3$, at least about 0.75 lb/ft$^3$, at least about 0.94 lb/ft$^3$, at least about 1.25 lb/ft$^3$, and not greater than about 2.8 lb/ft$^3$, not greater than about 2.5 lb/ft$^3$, not greater than about 2.2 lb/ft$^3$, not greater than about 1.87 lb/ft$^3$, not greater than about 1.56 lb/ft$^3$; and a compressed density inside the container of at least about 0.62 lb/ft$^3$, at least about 0.75 lb/ft$^3$, at least about 0.94 lb/ft$^3$, at least about 1.25 lb/ft$^3$, at least about 1.56 lb/ft$^3$, and not greater than about 3 lb/ft$^3$, not greater than about 2.8 lb/ft$^3$, not greater than about 2.5 lb/ft$^3$, not greater than about 2.2 lb/ft$^3$, not greater than about 1.87 lb/ft$^3$.

Embodiment 17

The insulation product of any of these embodiments, wherein the second insulation material has a density of at least about 0.25 lb/ft$^3$, at least about 0.4 lb/ft$^3$, at least about 1 lb/ft$^3$, at least about 1.5 lb/ft$^3$, at least about 2 lb/ft$^3$, not greater than about 3 lb/ft$^3$, not greater than about 4 lb/ft$^3$, not greater than about 5 lb/ft$^3$, not greater than about 6 lb/ft$^3$, not greater than about 8 lb/ft$^3$.

Embodiment 18

The insulation product of any of these embodiments, wherein the first insulation material is compressed by at least about 10%, at least about 20%, at least about 30%, at least about 40%, at least about 45%, and not greater than about 80%, not greater than about 75%, not greater than about 70%, not greater than about 65%, not greater than about 60%.

Embodiment 19

The insulation product of any of these embodiments, wherein a thickness ratio (TR) is defined as a thickness of the compressed first layer (TF) to a thickness of the second layer (TS), and the thickness ratio (TR=TF/TS) is at least about 0.1, at least about 0.2, at least about 0.3, at least about 0.4, at least about 0.5, and not greater than about 0.9, not greater than about 0.8, not greater than about 0.7, not greater than about 0.6.

Embodiment 20

The insulation product of any of these embodiments, wherein the first layer substantially covers an entire interior surface of the container, the second layer substantially covers an entire opposite interior surface of the container, and the second layer substantially covers and compresses an entire surface of the first layer.

Embodiment 21

The insulation product of any of these embodiments, wherein the first insulation material comprises: an uncompressed thermal resistance (R-value) of at least about R10, at least about R11, at least about R12, at least about R13, at least about R14, at least about R15, and not greater than about R25, not greater than about R24, not greater than about R23, not greater than about R22, not greater than about R21, not greater than about R20; and a compressed R-value of at least about R12, at least about R14, at least about R16, at least about R18, at least about R20, and not greater than about R34, not greater than about R32, not greater than about R30, not greater than about R28, not greater than about R26.

Embodiment 22

The insulation product of any of these embodiments, wherein the first insulation material comprises: an uncompressed thermal conductivity (λ) of at least about 0.31 Btu·in/(ft2·hr·F), at least about 0.30 Btu·in(ft2·hr·F), at least about 0.29 Btu·in(ft2·hr·F), at least about 0.28 Btu·in (ft2·hr·F), at least about 0.27 Btu·in(ft2·hr·F), and not greater than about 0.22 Btu·in(ft2·hr·F), not greater than about 0.23 Btu·in(ft2·hr·F), not greater than about 0.24 Btu·in(ft2·hr·F), not greater than about 0.25 Btu·in(ft2·hr·F), not greater than about 0.26 Btu·in(ft2·hr·F); and a compressed thermal conductivity (λ) of at least about 0.31 Btu·in/(ft2·hr·F), at least about 0.30 Btu·in(ft2·hr·F), at least about 0.29 Btu·in (ft2·hr·F), at least about 0.28 Btu·in(ft2·hr·F), at least about 0.27 Btu·in(ft2·hr·F), and not greater than about 0.21 Btu·in (ft2·hr·F), not greater than about 0.22 Btu·in(ft2·hr·F), not greater than about 0.23 Btu·in(ft2·hr·F), not greater than about 0.24 Btu·in(ft2·hr·F), not greater than about 0.25 Btu·in(ft2·hr·F).

Embodiment 23

The insulation product of any of these embodiments, wherein the second insulation material comprises a thermal conductivity (λ) of at least about 0.18 Btu·in/(ft2·hr·F), at least about 0.17 Btu·in(ft2·hr·F), at least about 0.16 Btu·in (ft2·hr·F), and not greater than about 0.14 Btu·in(ft2·hr·F), not greater than about 0.15 Btu·in(ft2·hr·F), not greater than about 0.16 Btu·in(ft2·hr·F).

Embodiment 24

The insulation product of any of these embodiments, wherein the second insulation material comprises a thermal resistance (R-value, aged) of at least about R4/inch, at least about R5/inch, at least about R5.5/inch, at least about R5.75/inch, and not greater than about R7/inch, not greater than about R6.5/inch, not greater than about R6.25/inch.

Embodiment 25

The insulation product of any of these embodiments, wherein the insulation product comprises an overall thermal resistance (R-value, aged) of at least about R12, at least about R13, at least about R14, at least about R15, at least about R16, and not greater than about R23, not greater than about R22, not greater than about R21, not greater than about R20, not greater than about R19.

Embodiment 26

The insulation product of any of these embodiments, wherein the insulation product has an overall thermal resistance (R-value, aged) of at least about R22, at least about R23, at least about R24, at least about R25, at least about R26, and not greater than about R36, not greater than about R35, not greater than about R34, not greater than about R33, not greater than about R32.

Embodiment 27

The insulation product of any of these embodiments, wherein the insulation product has an overall acoustic property comprising a noise reduction or Sound Transmission Class (STC) rating of at least about 33 dB, at least about 34 dB, at least about 35 dB, at least about 36 dB, at least about 37 dB, and not greater than about 38 dB, not greater than about 39 dB, not greater than about 40 dB.

Embodiment 28

The insulation product of any of these embodiments, wherein the container comprises at least one of a natural material, a synthetic material, a board, wood, gypsum, rigid insulation, oriented strand board (OSB), plywood and particle board.

Embodiment 29

The insulation product of any of these embodiments, wherein the second insulation material comprises an expansion factor of at least about 2×, at least about 5×, at least about 10×, at least about 20×, at least about 50×, at least about 100×, not greater than about 200×, not greater than about 400×, not greater than about 600×, not greater than about 800×, not greater than about 1000×.

Embodiment 30

The insulation product of any of these embodiments, wherein the container comprises a flexural strength of at least about 10 lbf, at least about 20 lbf, at least about 30 lbf, at least about 40 lbf, at least about 50 lbf, at least about 60 lbf, and not greater than about 300 lbf, not greater than about 200 lbf, not greater than about 175 lbf, not greater than about 150 lbf, not greater than about 125 lbf, not greater than about 100 lbf.

Embodiment 31

The insulation product of any of these embodiments, wherein the container is portable.

Embodiment 32

The insulation product of any of these embodiments, wherein the container is a rectangular box.

Embodiment 33

The insulation product of any of these embodiments, wherein the rectangular box comprises at least one of: a length of at least about 1 foot, at least about 3 feet, at least about 5 feet, at least about 7 feet, at least about 9 feet, and not greater than about 36 feet, not greater than about 24 feet, not greater than about 16 feet, not greater than about 14 feet, not greater than about 12 feet; a width of at least about 6 inches, at least about 8 inches, at least about 10 inches, at least about 12 inches, at least about 14 inches, and not greater than about 16 inches, not greater than about 20 inches, not greater than about 24 inches, not greater than about 28 inches, not greater than about 32 inches, not greater than about 36 inches, not greater than about 40 inches, not greater than about 44 inches, not greater than about 48 inches; and a depth of at least about 3 inches, at least about 3.5 inches, at least about 4 inches, at least about 4.5 inches, and not greater than about 5 inches, not greater than about 5.5 inches, not greater than about 6 inches.

Embodiment 34

The insulation product of any of these embodiments, wherein the first layer is substantially uniform, the second layer is substantially uniform, and each layer has a flatness (Rmax) of at least about 0.08 inches, at least about 0.16 inches, at least about 0.24 inches, at least about 0.31 inches, at least about 0.39 inches, not greater than about 0.79 inches, not greater than about 0.71 inches, not greater than about 0.63 inches, not greater than about 0.55 inches, not greater than about 0.47 inches.

Embodiment 35

The insulation product of any of these embodiments, wherein the container can be cut to length, the container can be cut to width, but the container cannot be cut to depth.

Embodiment 36

The insulation product of any of these embodiments, wherein the second insulation material also is compressed.

Embodiment 37

A method of fabricating an insulation product, comprising: (a) providing a container; (b) installing a first layer of a first insulation material on an interior surface of the container; and then (c) installing a second layer of a second insulation material between the first layer and an opposite interior surface of the container, such that the second insulation material expands and compresses the first layer.

Embodiment 38

The method of any of these embodiments, wherein the container is open during step (b), and the container is closed during step (c).

Embodiment 39

The method of any of these embodiments, wherein the container has a single aperture, and step (c) comprises injecting the second insulation material through the single aperture.

Embodiment 40

The method of any of these embodiments, wherein the container has a plurality of apertures, and step (c) comprises simultaneously injecting the second insulation material through all of the plurality of apertures.

Embodiment 41

The method of any of these embodiments, wherein step (c) comprises mixing isocyanate and polyol resin.

Embodiment 42

The method of any of these embodiments, further comprising at least one of the steps of cutting the container to length and cutting the container to width, but not cutting the container to depth.

Embodiment 43

A method of fabricating an insulation product, comprising: (a) defining a structure in a building, the structure having studs, claddings mounted to the studs, and structure spaces between the studs and claddings; (b) installing first layers of a first insulation material and substantially covering a first one of the claddings inside respective ones of the structure spaces; and then (c) installing second layers of a second insulation material in the structure spaces between the first layers and an opposite cladding of the structure, such that the second insulation material expands and compresses the first layers.

Embodiment 44

The method of any of these embodiments, wherein the structure spaces are open during step (b), and the structure spaces are closed during step (c).

Embodiment 45

The method of any of these embodiments, wherein the first one of the claddings is an interior cladding, the second one of the claddings is an exterior cladding, step (b) comprises installing the first layers adjacent an interior of the building, and step (c) comprises installing the second layers adjacent an exterior of the building.

Embodiment 46

The method of any of these embodiments, wherein the first one of the claddings is an exterior cladding, the second one of the claddings is an interior cladding, step (b) comprises installing the first layers adjacent an exterior of the building, and step (c) comprises installing the second layers adjacent an interior of the building.

Embodiment 47

The method of any of these embodiments, wherein the structure is at least one of a wall with wall spaces, a ceiling with ceiling spaces, and a roof with roof spaces.

Embodiment 48

A structure in a building, comprising: studs, first and second claddings mounted to opposite sides of the studs, and structure spaces defined between the studs and the opposing claddings; a first insulation material comprising first layers on and substantially covering a first one of the claddings inside the structure spaces; and a second insulation material comprising second layers inside the structure spaces, the first layers are compressed and substantially covered by the second layers, and the second layers substantially cover a second one of the claddings inside the structure spaces.

Embodiment 49

The structure of any of these embodiments, wherein the structure is at least one of a floor with floor spaces, a wall with wall spaces, a ceiling with ceiling spaces, and a roof with roof spaces.

Embodiment 50

A structure in a building, comprising: studs, first and second claddings mounted to opposite sides of the studs, and structure spaces defined between the studs and the claddings; two different types of insulation in the structure spaces, with a second type of the insulation compressing a first type of the insulation; and at least about 80% of the structure meets a specification comprising: a thermal conductivity ($\lambda$) in a range of about 0.14 Btu·in/(ft$^2$·hr·F) to about 0.28 Btu·in; a thermal resistance (R-value) in a range of about R13 to about R22; an acoustic property comprising noise reduction in a range of about 33 dB to about 40 dB; and an average density in a range of about 0.063 lb/ft$^3$ to about 1.87 lb/ft$^3$.

Embodiment 51

The structure of any of these embodiments, wherein the structure is at least one of a floor with floor spaces, a wall with wall spaces, a ceiling with ceiling spaces, and a roof with roof spaces.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of fabricating an insulation product, comprising the steps of:
providing a structure comprising a first interior surface, a second interior surface, and a cavity formed between the first interior surface and the opposing second interior surface; then
installing a first compressible insulation material in the cavity on the first interior surface; then
installing a second expandable insulation material in the cavity between the first compressible insulation material and the opposing second interior surface; and then
compressing the first compressible insulation material by expanding the second expandable insulation material during the installation of the second expandable insulation material.

2. The method of claim 1, wherein the first compressible insulation material comprises, an organic material, a compressible mineral material, a synthetic material, cellulose, fiberglass, polyester fibers, polyethylene fibers, glass wool, stone wool, sheep wool, wood fibers, cotton, hemp, flax, cork, straw, feathers, and chopped recycled cloth.

3. The method of claim 2, wherein the first compressible insulation material comprises an uncompressed density of at least about at least about 0.35 lb·/ft$^3$ and not greater than about 2.8 lb·/ft$^3$ and a compressed density of at least about 0.62 lb·/ft$^3$ and not greater than about 3 lb·/ft$^3$.

4. The method of claim 1, wherein the second expandable insulation material comprises at least one of a foam, a spray foam, a slow rise spray foam, and a commercially available expanding foam.

5. The method of claim 4, wherein the second expandable insulation material comprises a density of at least about 0.25 lb·/ft$^3$ and not greater than about 3 lb·/ft$^3$.

6. The method of claim 4, wherein the second expandable insulation material forms an airtight layer.

7. The method of claim 6, wherein the airtight layer comprises an air permeance of less than about 0.004 L/(s·m$^2$)@ 75 Pa for a one inch thickness.

8. The method of claim 1, wherein the first compressible insulation material forms a first layer substantially covering the first interior surface, and wherein the second expandable insulation material forms a second layer substantially covering the opposing second interior surface.

9. The method of claim 8, wherein second expandable insulation material compresses the entire first layer of the first compressible insulation material.

10. The method of claim 9, wherein the first compressible insulation material comprises at least one of a liner, a facing, and a barrier disposed between the first compressible insulation material and the second expandable insulation material.

11. The method of claim 9, wherein the first compressible insulation material and the second expandable insulation material substantially fill the cavity of the structure.

12. The method of claim 1, wherein a thickness ratio (TR) is defined as a thickness of the compressed first compressible insulation material (TF) to a thickness of the second expandable insulation material (TS), and the thickness ratio (TR=TF/TS) is at least about 0.1 and not greater than about 0.9.

13. The method of claim 1, wherein the first compressible insulation material is compressed by expanding the second expandable insulation material upon installing the second expandable insulation material by at least about 20% and not greater than about 80%.

14. The method of claim 1, wherein the first compressible insulation material comprises a first R-value, and wherein the insulation product comprises an overall thermal resistance (R-value, aged) after compressing the first compressible insulation material by expanding the second expandable insulation material that is higher than the first R-value.

15. The method of claim 14, wherein the overall thermal resistance (R-value, aged) is at least about R12 and not greater than about R23.

16. The method of claim 1, wherein the structure comprises a container, and wherein the container comprises at least one aperture through which the second expandable insulation material is injected.

17. The method of claim 1, wherein the structure comprises a container, and wherein the container can be cut to length and width.

18. The method of claim 1, wherein the structure comprises a building, wherein the first interior surface and the opposing second interior surface comprise wall claddings separated by at least two studs in a wall of the building, and wherein the cavity is further formed between the at least two studs.

19. A method of fabricating an insulation product, comprising the steps of:
providing a structure comprising a plurality of studs, a first interior cladding mounted to a first side of the plurality of studs, and a second interior cladding mounted to an opposing side of the plurality of studs to define a cavity between the plurality of studs, the first interior cladding, and the second interior cladding; then installing a first compressible insulation material in the cavity to substantially cover the first interior cladding; and then installing a second expandable insulation material in the cavity between the first compressible insulation material and the second interior cladding, such that the second expandable insulation material expands and compresses the first compressible insulation against the first interior cladding during installation, and such that the first compressible insulation material and the second expandable insulation material substantially fill the cavity.

20. The method of claim 19, wherein the first compressible insulation material comprises a first R-value, and wherein the insulation product comprises an overall thermal resistance (R-value, aged) after compressing the first compressible insulation material by expanding the second expandable insulation material that is higher than the first R-value.

* * * * *